United States Patent [19]
Gerhard et al.

[11] Patent Number: 6,145,536
[45] Date of Patent: Nov. 14, 2000

[54] DEVICE FOR A FUEL SUPPLY SYSTEM FOR AN INTERNAL COMBUSTION ENGINE

[75] Inventors: Albert Gerhard, Tamm; Willi Strohl, Beilstsein; Jochen Rose, Hemmingen; Erich Eiler, Sersheim, all of Germany

[73] Assignee: Robert Bosch GmbH, Stuttgart, Germany

[21] Appl. No.: 09/117,844

[22] PCT Filed: Oct. 18, 1997

[86] PCT No.: PCT/DE97/02405

§ 371 Date: Nov. 13, 1998

§ 102(e) Date: Nov. 13, 1998

[87] PCT Pub. No.: WO98/25023

PCT Pub. Date: Jun. 11, 1998

[30] Foreign Application Priority Data

Dec. 6, 1996 [DE] Germany .......................... 196 50 784

[51] Int. Cl.[7] .................................................. F16K 31/36
[52] U.S. Cl. .......................................... 137/510; 123/514
[58] Field of Search ..................................... 123/514, 509, 123/463, 456; 137/510, 509

[56] References Cited

U.S. PATENT DOCUMENTS

| 2,286,713 | 6/1942 | Burks | 137/510 |
| 2,318,157 | 5/1943 | Heiser | 137/510 |
| 4,038,506 | 7/1977 | Filip | 92/98 R |
| 5,065,725 | 11/1991 | Spoetter | 137/510 |

FOREIGN PATENT DOCUMENTS

| 44 02 224 | 1/1994 | Germany . |
| 85303715 | 5/1985 | United Kingdom . |

*Primary Examiner*—Pamela Wilson
*Assistant Examiner*—Ken B. Rinehart
*Attorney, Agent, or Firm*—Ronald E. Greigg; Edwin E. Greigg

[57] ABSTRACT

The invention relates to a device for a fuel supply system, having a pressure chamber that communicates with a fuel connection, and having a diaphragm built in on its outer peripheral region in a basic body which partitions off the pressure chamber, wherein the diaphragm is fastened in the peripheral region with a spring ring that is under initial tension and is retained on the basic body.

24 Claims, 6 Drawing Sheets

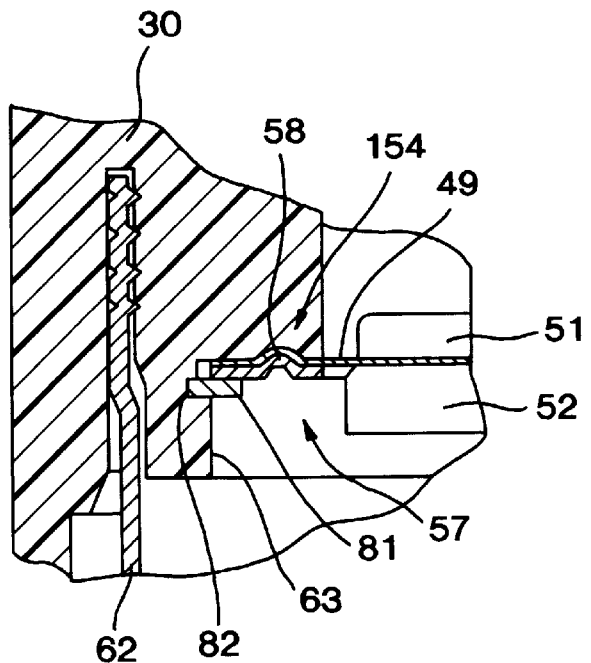
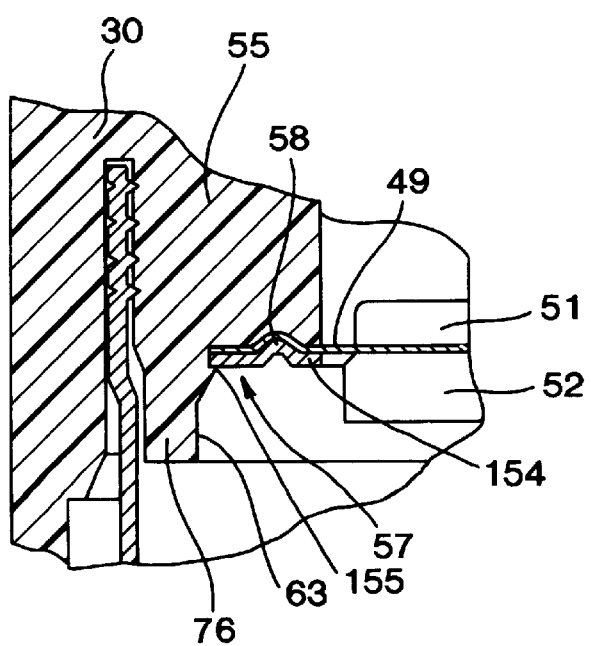

DEVICE FOR A FUEL SUPPLY SYSTEM FOR AN INTERNAL COMBUSTION ENGINE

PRIOR ART

The invention is based on a device for a fuel supply system for an internal combustion engine.

One such device is known from German Patent Disclosure DE 44 02 224 A1. This device has a feed pump, which is disposed in the supply tank and can be introduced through an opening in the supply tank. The opening in the supply container can be closed by means of a closure part on which a pressure regulator is disposed. The pressure regulator has a pressure chamber which has a communication with the pressure side of the feed pump, with the internal combustion engine, and with a relief line. The closure part has a plastic, flangelike basic body that closes the opening. An indentation is formed in the basic body, and a stub embodied integrally with the basic body and forming a communication of the pressure chamber with the relief chamber protrudes into this indentation. To form the pressure chamber, the indentation of the basic body is covered with an elastically deformable diaphragm that cooperates directly with the face end of the stub, as a seat. The diaphragm is urged by a spring toward the stub, and if a predetermined pressure in the pressure chamber is exceeded, the diaphragm releases the stub for communication of the pressure chamber with the relief chamber. The diaphragm is secured to the basic body. In the known device, the diaphragm is placed in the indentation, the spring is placed on it, and then the diaphragm together with a covering is braced against the basic body. Since in the known device the force of the spring acts on the diaphragm before the diaphragm is firmly fastened in place, it is possible to prevent with certainty that the diaphragm will shift to the side somewhat, thus allowing functional disturbances (such as pressure regulation errors, leaks, and so forth) to occur. If the device is installed in an engine compartment, then leaks can be very dangerous.

In an alternative embodiment of a device of DE 44 02 224 A1, it is provided that the retaining element has a flange on which free ends, bent outward, are formed. To secure the retaining element, the flange is disposed relative to a collar of the basic body, and as a result an outer edge of the diaphragm is fastened in place. The free ends of the flange engage the hook, disposed on the collar, from behind, and as a result the flange of the retaining element is disposed with tension toward the basic body, and the diaphragm is fastened in place. However, this embodiment has the disadvantage that the hooks of the recess must absorb the fastening force of the spring that acts on the diaphragm, so that the diaphragm will close the stub toward the pressure chamber. The attendant major retention forces cannot be absorbed sufficiently by the hooks, moreover, it is has been found chat after a relatively long period in service, material fatigue can occur, for instance from swelling of the plastic, and as a result the flange of the retaining element cannot be disposed with adequate initial tension relative to the recess of the basic body and the diaphragm cannot be fixed relative to the recess.

ADVANTAGES OF THE INVENTION

The device according to the invention for a fuel supply system, has an advantage over the prior art that simple, secure mounting of the diaphragm with regard to the basic body is accomplished with little effort or expense, and exact positioning of the diaphragm relative to the basic body can be attained. This enables a tight, durable connection with the basic body, and as a result the pressure chamber can be reliably partitioned off by the diaphragm. Because of the disposition of the spring ring on the basic body for fixing the diaphragm, it becomes possible for the clamping force of the prestressed spring ring, which is disposed relative to the basic body and retains the diaphragm, to be determined only by the initial tension of the spring ring. This arrangement also has the advantage that once the diaphragm has been positioned relative to the basic body, fastening of the diaphragm relative to the basic body is made possible by simply placing the spring ring in place, which preferably engages the peripheral region of the diaphragm, and twisting forces or other forces that cause shifting or impairment of the position of the diaphragm relative to the basic body cannot occur. In addition, the spring ring that fixes the diaphragm relative to the basic body has the advantage that because of the resilient arrangement or the arrangement with initial tension, and equalization of tolerance is possible, thus providing a secure disposition of the diaphragm relative to the basic body. It is also advantageous that in the device embodied according to the invention, first the diaphragm is firmly braced against the basic body before a spring that presses against the diaphragm is put in place. This prevents the spring from undesirably shifting the diaphragm toward the side.

In the proposed device, the stub through which the fuel return extends can be injection molded together with the basic body as a plastic part, using an injection molding tool. This has the advantage that in the production of the basic body, no additional effort or expense is needed to produce the stub.

In an advantageous embodiment of the invention, it is provided that the clamping element is embodied as a cup-springlike ring. By means of this metal ring, the diameter that defines the effective surface area of the diaphragm toward the outside can be determined, and as a result an increase in the effective area of the diaphragm during use of the device is prevented; such an increase, if the diaphragm is used in a pressure regulator, could be expressed in a drop in the regulated pressure.

Especially if the device is disposed with the diaphragm outside a fuel tank, it is absolutely important that the pressure chamber of the device remain tightly sealed off from the outside during the entire service life of the device. By means of the elastic prestressing of the installed spring ring, the advantage is attained that the diaphragm is pressed against the basic body with sufficient force even over a relatively long operating time of the device, regardless of any settling of the preferably plastic basic body.

In another advantageous embodiment of the invention, it is provided that the spring ring, in the region where it is fastened in place, has a camlike lobe pointing toward the diaphragm, that engages an indentation, formed congruently in the basic body, of the fastening point. As a result, this makes an additional improvement possible in that when the diaphragm is deflected upon excessive pressure in the pressure chamber, the diaphragm is securely held in its position in the fastening point. By means of this fastening, it can also be assured that an increase in the sealing relative to the pressure chamber is accomplished.

In another advantageous feature of the invention it is provided that the spring ring acting as a clamping element has an annular collar on its free ends, so that the spring ring is cup-shaped in cross-section. As a result, an increase in the clamping force can be attained when the cup-springlike ring is disposed on the basic body. Because of the virtually perpendicularly embodied receptacle for the spring ring, the cup-springlike ring, whose portions forming the cuplike cross section are disposed at an angle of more than 90°, can exert an additional clamping force on the portion disposed in the fastening point, because the portion forming an annular collar can exert an additional force on the portion oriented toward the diaphragm.

In another advantageous feature of the invention it is provided that the spring ring can be inserted into the recess freely from above and secured with initial tension. This can advantageously be accomplished via a detention connection. It can also advantageously be provided that a springlike annular element, in particular a snap ring, can be inserted into a groove provided on the basic body. It can also advantageously be provided that the free ends of the basic body adjoining the recess, a fastening in place of the diaphragm and disposition of the spring ring with initial tension can be provided by deformation, such as crimping, caulking or the like.

BRIEF DESCRIPTION OF THE DRAWINGS

A plurality of exemplary embodiments of the invention are shown in the drawings and described in further detail in the ensuing description. Shown on different scales are:

FIG. 6, a cross-sectional view of a further variant for fastening the diaphragm group to the basic body;

FIG. 8, a cross-sectional view of a further variant for fastening a diaphragm group to the basic body.

DESCRIPTION OF THE EXEMPLARY EMBODIMENTS

Figure 1:
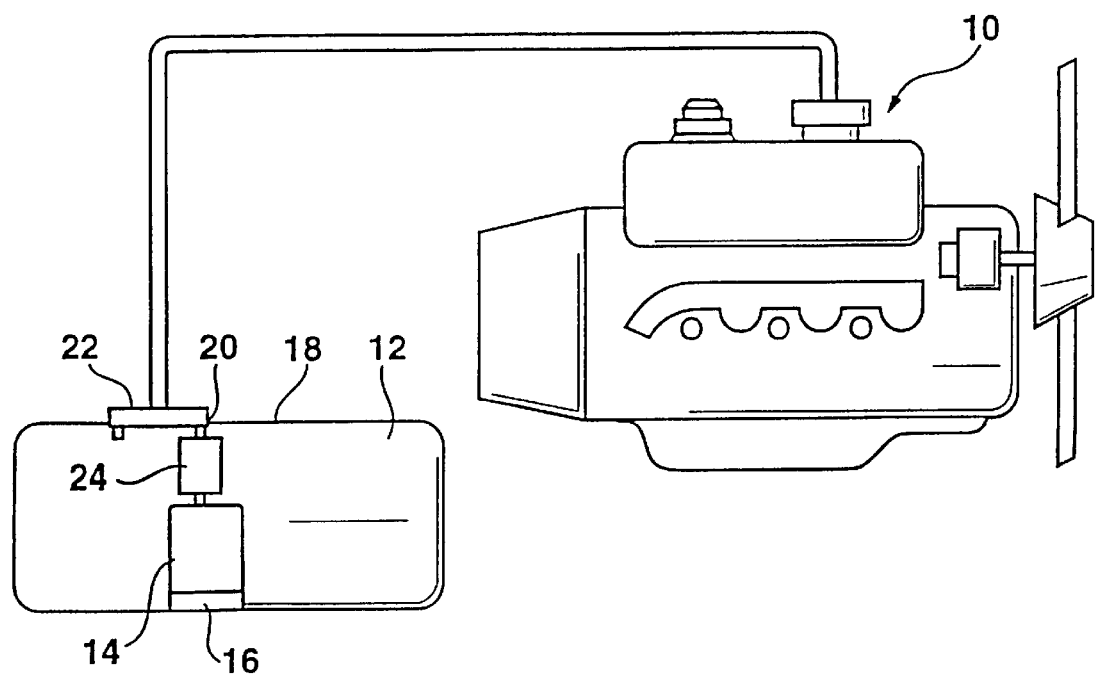
FIG. 1, a device for supplying an internal combustion engine with fuel from a supply container, FIG. 2, a closure part of the supply container of FIG. 1 in a longitudinal section in accordance with a first exemplary embodiment.

A device shown in simplified form in FIG. 1 is used to supply an internal combustion engine 10 with fuel from a supply container 12. It has a feed pump 14, which is disposed in the supply container 12 and retained there in a manner not shown. The feed pump 14 may be embodied arbitrarily and on its intake side aspirates fuel from the reservoir 16 in the supply container 12. The supply container 12, in a wall 18, has an opening 20 through which the feed pump 14 can be introduced. After the introduction of the feed pump 14, the opening 20 is closable with a closure part 22; a line for connecting the pressure side of the feed pump 14 to the engine 10 is extended through the closure part 22. A fuel filter 24 may be disposed in the communication between the pressure side of the feed pump 14 and the closure part 22.

Figure 2:
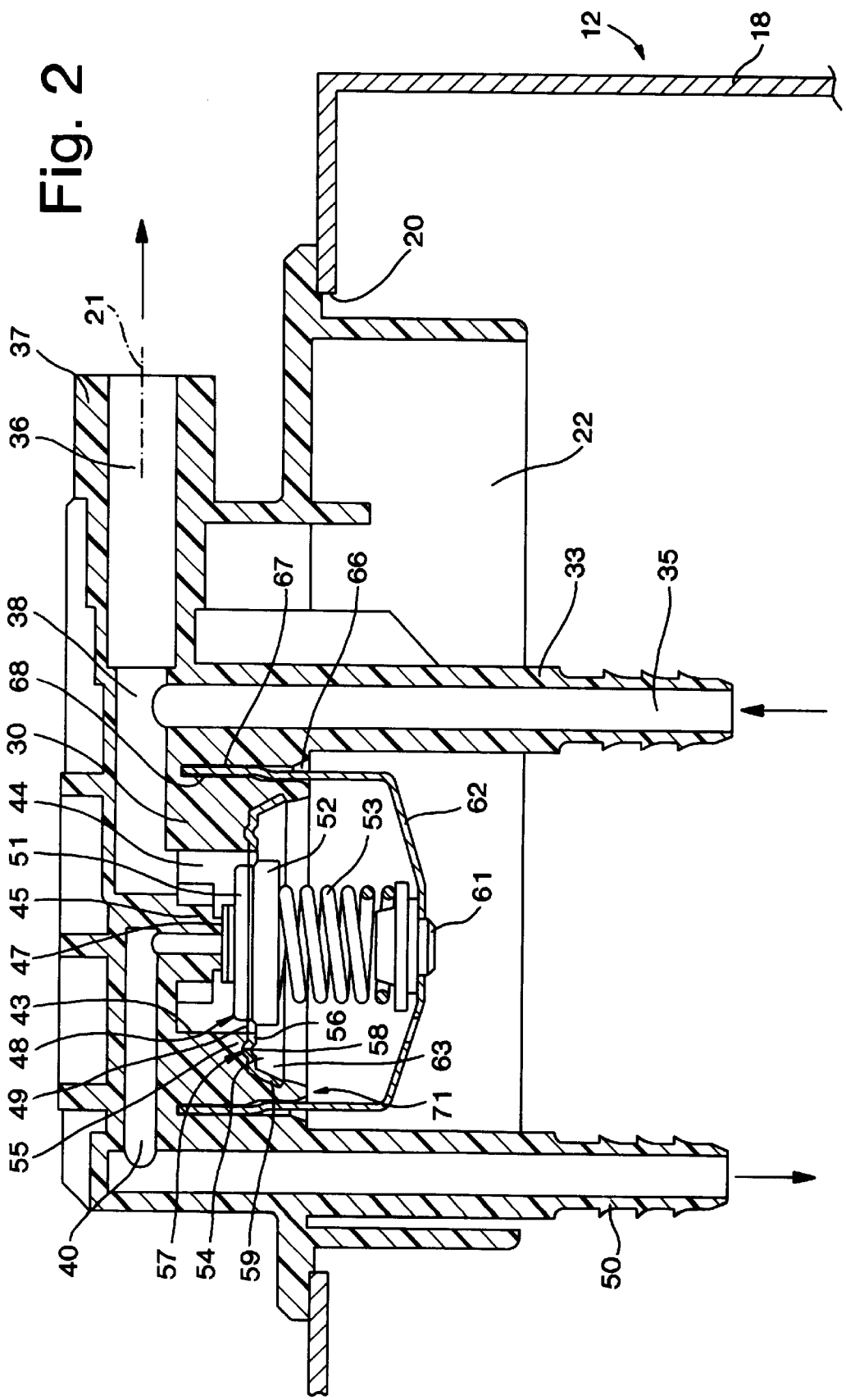

FIG. 2 shows the embodiment of the closure part 22. The closure part 22 has a flangelike basic body 30, which is produced from plastic by injection molding and covers the opening 20 in the supply container 12. A sealing element may be disposed between an outer edge of the closure part 22 and the wall 18 of the closure part 22. The closure part 22 is secured to the supply container 12 in a manner not shown.

Positional definitions with respect to the closure part 22 will now be given, where a disposition inward means into the supply container 12, and a disposition outward means pointing away from the supply container 12.

An inward-pointing connection stub 33 is formed integrally onto the basic body 30, and a line (not shown) for connection with the pressure side of the feed pump 14 can be connected to the connection stub. Also protruding outward from the basic body 30 is a further connection stub 37, to which a line (not shown) can be connected for connection with the engine 10. The connection stubs 33, 37 communicate with one another through conduits 35 and 36, disposed in the basic body 30; the conduit 35 of the connection stub 33 extends approximately perpendicular to the plane 21. The conduit 36 of the connection stub 37 extends outward, parallel to the plane 21. The connection stubs 33 and 37 may also be disposed in some other, largely arbitrary angular position relative to the plane 21 and to one another.

A transitional region between the conduits 35 and 36 communicates with a conduit 38, which discharges into an indentation 43 of the basic body 30. A stub 45 is disposed centrally to the indentation 43 on the basic body 30 and communicates with a conduit 40, which discharges into an inward-pointing connection stub 50. The stub 45 has a seat 47 toward the inside, which is closed, in a closing position, by a diaphragm group 48. The diaphragm group 48 has a diaphragm 49, on whose outward-pointing side a cup 51 is disposed, which rests in the closing position on the seat 47 and tightly closes off the stub 45. On the other side of the diaphragm 49, pointing inward, is a cup 52 on which a spring 53 is supported. A pressure chamber 44 closed off from the diaphragm 49 is formed in the indentation 43. The conduits 35 and 38 act as a fuel connection for supplying fuel into the pressure chamber 44.

Figure 3:
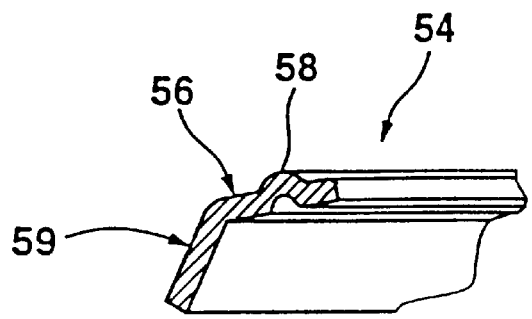
FIG. 3, a schematic sectional view of an unstressed spring ring according to the invention.
Figure 4:
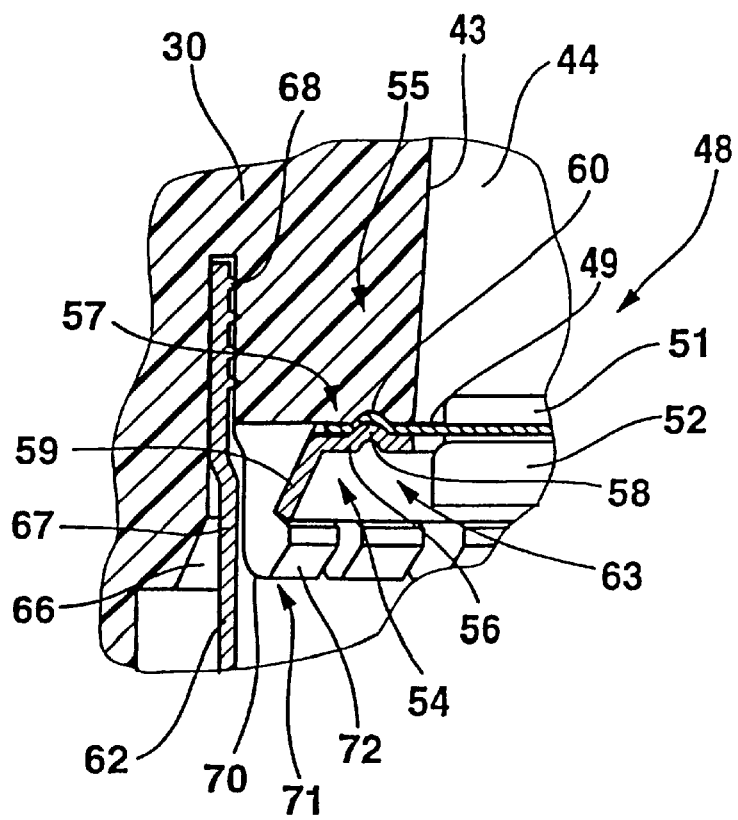
FIG. 4, a schematic detail view of a detention connection that engages the basic body and fixes the diaphragm.

The diaphragm 49 is secured in the peripheral region to the basic body 30 via a spring ring 54 acting as a clamping element, as shown in FIG. 4. The spring ring 54 is embodied as shown in FIG. 3 as a cup-shaped ring, preferably of metal. Once the diaphragm 49 is positioned with its peripheral region on a shoulder 55 of the basic body 30, the spring ring 54 is positioned relative to the shoulder 55. The spring ring 54 is fixed by means of a detention connection 71 relative to a recess 63, which forms part of the indentation 43. The detention connection 71 of FIG. 4 is formed by an encompassing annular collar 70, which toward the longitudinal axis of the stub 45 has radially inward-yielding hooks 72 that engage the spring ring 54 from behind when the spring ring is in its fixed position. It is provided that the hooks 72, like the basic body 30, are preferably made from plastic, and the hooks 72 are designed to be resilient. The basic body 30 and the hooks 72 can be jointly produced without major effort in the same injection mold. The basic body 30 and the hooks 72 are a single integral component. By radially slitting the annular collar 70 in multiple places as shown in FIG. 4, the hooks 72 can yield radially outward so far, during the mounting of the spring ring 54 and the basic body 30, that the spring ring 54 can snap into place. Once the spring ring 54 is pressed against the shoulder 55, the hooks 72 yield elastically radially inward and thereby hold the spring ring 54 against the shoulder 55.

Viewed in the axial direction, the height of the second portion 59 of the spring ring 54 is adapted to the spacing between the shoulder 55 and the radially inward-producing hooks 72 in such a way that in the mounted state the spring ring 54 is elastically deformed, which leads to prestressing in the spring ring 54, so that the first portion 56 of the spring ring 54 braces the outer peripheral region of the diaphragm 49 against the shoulder 55 of the basic body 30.

The spring ring 54 can be imagined as being divided into a first portion 56 and second portion 59. With its first portion 56, the spring ring 54 presses the diaphragm 49 against the shoulder 55, thus forming a fastening point 57 of the diaphragm 49. The first portion 56 of the clamping element 54 has a camlike lobe 58, which engages a congruently formed encompassing indentation 60 in the shoulder 55. As a result, for the same prestressing force in the spring ring 54, a better retention of the diaphragm 49 can be accomplished. Moreover, by means of the lobe 58, an improvement in the sealing of the pressure chamber 44 can be provided. The indentation 60 in the shoulder 55 of the basic body 30 may also be not as deep as the height of the lobe 58. It is thereby attained that in the region of the lobe 58, both between the diaphragm 49 and the basic body 30 and between the diaphragm 49 and the encompassing lobe 58, a comparatively high pressure per unit of surface area and thus good sealing action and good retention of the diaphragm 49 are assured. It should also be pointed out that it is also theoretically possible to provide the lobe 58 on the basic body 30 and the congruent indentation on the spring ring 54. However, because the basic body 30 is preferably of plastic and the spring ring 54 is preferably of resilient, hardened steel, it is expedient to provide the lobe 58 on the spring ring 54 and to provide the indentation on the basic body 30.

Even if the indentation 60 in the basic body 30 is dispensed with, the high pressure per unit of surface area and thus the good sealing action and the good retention of the diaphragm 49 are obtained by means of the lobe 58.

The first portion 56 of the spring ring 54 is adjoined by the second portion 59, which in cross section together with the first portion 56 has a cup-shaped embodiment. The first portion 56, in the unstressed state or in other words before the spring ring 54 is installed in the recess 63, as shown in FIG. 3, is disposed at an obtuse angle to the second portion 59. By the disposition of the spring ring 54 in the recess 63, the spring ring 54 is prestressed, and as a result an equalization of tolerances can be accomplished and at the same time secure fastening of the diaphragm 49 relative to the shoulder 55 is provided.

In the fastened position, the first portion 56 is deformed relative to the second portion 59 of the spring ring 54 such that these portions 56, 59 approach a right angle. This can provide a further increase in the clamping force at the fastening point 57.

Once the diaphragm group 48 with the diaphragm 49 is fixed relative to the basic body 30, the spring 53 is placed on the cup 52. An insert part 61 is disposed on the end of the spring 53 pointing toward the supply container 12. The diaphragm group 48, the spring 53, and the insert part 61 disposed toward the spring 53 are surrounded by a retaining element 62 and secured to the basic body 30. The retaining element 62 is embodied as a cap. This retaining element 62 has an opening in a longitudinal axis, in which opening the insert part 61 is disposed. The retaining element 62 is substantially U-shaped in cross section and is insertable into a slit 66 of the basic body 30. Barblike elements 68 are disposed on an inside or outside of the cylindrical jacket face 67 of the retaining element 62 and enable a simple, fast mounting of the retaining element 62 relative to the basic body 30. By simply being slipped on, the retaining element 62 can be disposed such that it is secure against being lifted off. The retaining element 62 preferably comprises deep-drawn steel.

Once the spring ring 54 is disposed on the basic body 30, the retaining element 62 is mounted on the basic body 30. The inside of the jacket face 67, in the exemplary embodiment shown in FIG. 4, is located tightly at the resilient hooks 72 of the basic body 30, or touches the outer circumference of the hooks 72, so that the hooks 72 of the detention connection 71 on the basic body 30, which retain the spring ring 54, can no longer escape radially outward once the retaining element 62 has been mounted, so that even when the diaphragm 49 and the spring ring 54 are located by a relatively high pressure in the pressure chamber 44, the hooks 72 on the basic body 30 securely retain the spring ring 54. This makes a very stable detention connection 71 possible, even if a not particularly high strength and therefore expensive plastic is used for the basic body 30.

Figure 5:
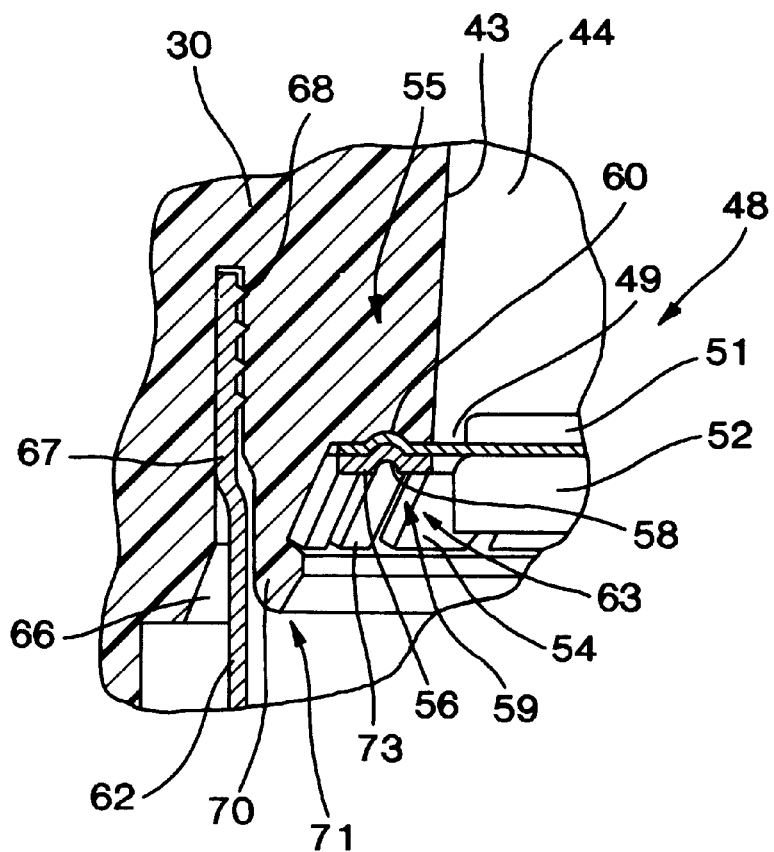
FIG. 5, an alternative embodiment of the detention connection of FIG. 4.

In FIG. 5, an alternative embodiment of the detention connection 71 of FIG. 4 is shown. The annular collar 70 of the detent connection 71 is embodied in continuous form and has a hooklike profile in cross section, while conversely the spring ring 54 has a second portion 59 that is formed by many radially inward-yielding tabs 73 that can be deflected individually. Otherwise, the description of FIG. 4 applies here as well.

By means of both embodiments in FIGS. 4 and 5, simple mounting at little effort and expense is provided, which enables tight, durable fixation of the diaphragm 49 with regard to the basic body 30.

The above-described design of the device has the advantage of providing simple, fast installation of the diaphragm 49 of the diaphragm group 48 in or on the basic body in a way that enables positionally correct positioning of the diaphragm group 48.

FIG. 6 as an example shows an alternative to FIG. 2. This embodiment, unlike FIG. 2, has a spring ring 154 of simple design and an alternative fastening of the spring ring 154.

Figure 7:
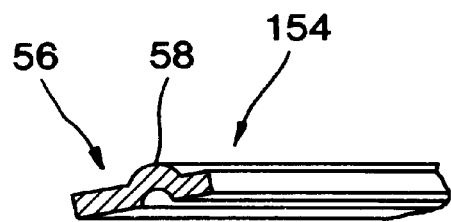
FIG. 7, a schematic sectional view of an alternative embodiment of a spring ring in the unstressed state.

The spring ring 154 is shown in FIG. 7 in the unstressed state before installation, and it is embodied similarly to a known cup spring. Like the spring ring 54 of FIG. 2, the spring ring 154 has the camlike lobe 58. The function of the lobe 58 is equivalent to that described in conjunction with FIG. 2. The fastening of the spring ring 154 in the recess 63 is effected via an annular element 81, which is insertable into a groove 82 in the basic body 30. The annular element 81 is slit at a point on its circumference in a manner similar to a so-called snap ring, and can be installed in the groove 82 by being radially compressed. After installation, the annular element 81 yields radially outward and is thereby held in the groove 82. In the installation of the annular element 81, the spring ring 154 is deflected out of its original, unstressed position in such a way that it has a virtually horizontal course, so that the maximum possible elastic tension in the spring ring 154 can be attained.

As an alternative, in fastening as described in conjunction with FIG. 6, the spring ring 54 shown in FIG. 2 can also be used, and vice versa.

In FIG. 8, a further alternative embodiment of a fastening of the spring ring 154 relative to the basic body 30 is shown for fixing the diaphragm 49 at the fastening point 57 of the basic body 30. Once the diaphragm 49 rests on the shoulder 55, the clamping element 154 is put in place on it. Next, by crimping or caulking a free end 76 of the basic body 30, the spring ring 154 is secured to the peripheral edge of the recess 63, before the end 76 is crimped or caulked, the spring ring 154 is in the form shown in FIG. 7. The spring ring 154 is placed in the recess 63 in such a way that before the crimping or caulking, the inner circumference of the spring ring 154 rests on the shoulder 155. During the crimping or caulking, the outer circumference of the spring ring 154 is pressed against the shoulder 55 of the basic body 30 by a tool that is on the order of a die. After the crimping or caulking of the end 76, the deformation of the spring ring 154 is preserved, thus creating an initial tension that securely fastens and firmly holds the diaphragm 49 between the shoulder 55 of the basic body 30 and the spring ring 154.

The combination of the clamping element or spring ring 54 or 154 and the fastening types of FIGS. 2, 4, 5, 6 and 8 can be combined arbitrarily with one another and can be modified in analogous ways.

As an alternative, it can also be provided that separately disposed parts are provided for securing a spring ring 54, 154, parts that engage the basic body and that fix the spring ring 54, 154 relative to the basic body 30 with initial tension, for instance by deformation or friction welding or ultrasound welding.

FIG. 2 shows an exemplary embodiment in which the device embodied according to the invention for a fuel supply system is embodied by way of example as a pressure regulator, and in which the basic body 30 has the task not only of retaining the diaphragm 49 in the spring ring 54 but also of covering the opening 20 of the supply container 12. However, it should be noted that the pressure regulator may also be disposed at some other point in the fuel supply system. For instance, the basic body 30 may also be a fuel distributor tube in the region of the engine, and then the feed lines to the individual fuel injection valves for instance branch off from the fuel distributor tube.

Figure 9:
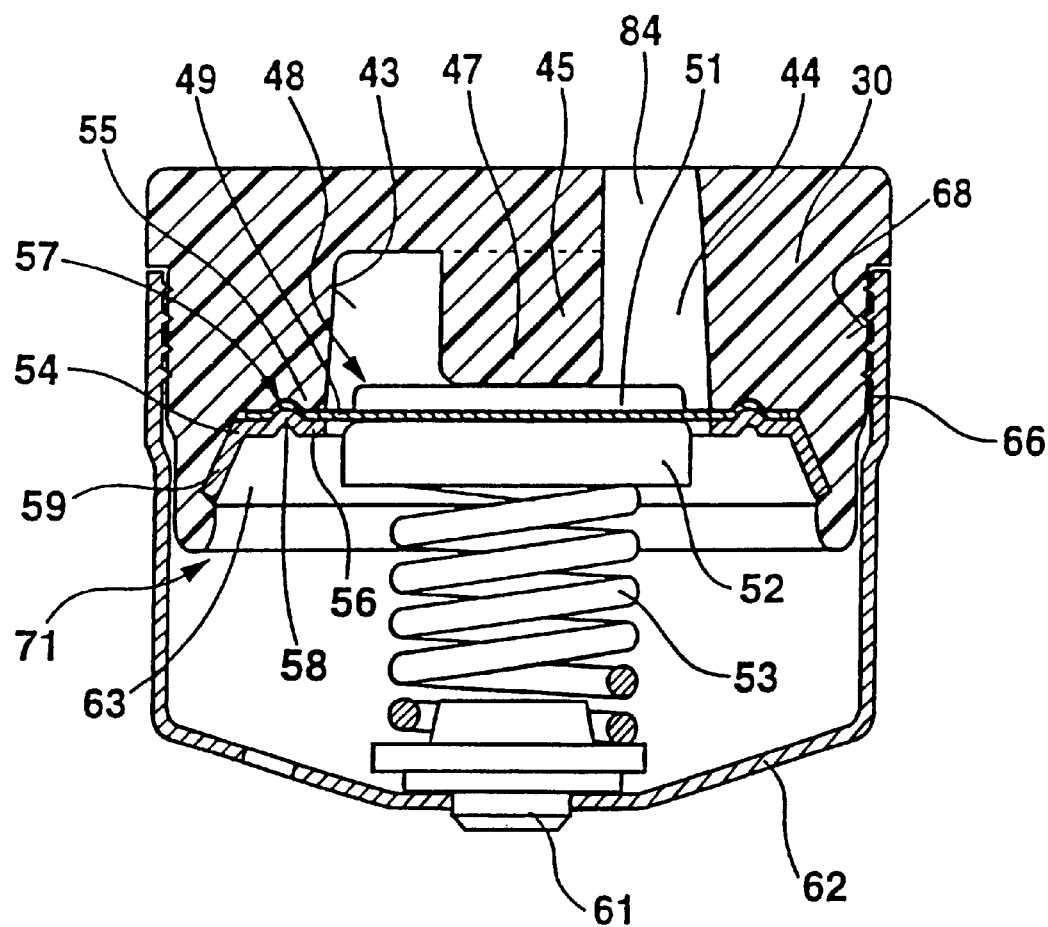
FIG. 9, an alternative embodiment of the device according to the invention for damping pressure pulsations of the fuel in the pressure chamber.

FIG. 9 also shows a device for a fuel supply system, with a diaphragm 49 fastened in its peripheral region by a spring ring 54 that is under initial tension and is retained on the basic body 30. In this embodiment as well, the pressure chamber 44 communicates with a fuel connection 84. Via the fuel connection 84, fuel can be delivered to the pressure chamber 44 or drawn off from the pressure chamber 44. The device shown in FIG. 9 serves for instance to smooth pressure pulsations of the fuel in the pressure chamber 44 or in the fuel connection 84. This device is therefore usually called a pressure damper. The device shown in FIG. 9 may, however, also be dimensioned such that the diaphragm 49 has a relatively long working stroke, so that upon a pressure rise the device can receive a corresponding quantity of fuel, which the pressure chamber 44 then dispenses again if the fuel pressure drops; given suitable dimensioning this device is then therefore also known as a fuel reservoir.

All the embodiments shown as examples herein have in common the fact that regardless of the remainder of the design of the device, and in particular regardless of whether the device functions as a pressure regulator, a pressure damper, or a fuel reservoir, the diaphragm 49 is always joined to the basic body 30 in the manner according to the invention, via the spring ring 54.

The foregoing relates to a preferred exemplary embodiment of the invention, it being understood that other variants and embodiments thereof are possible within the spirit and scope of the invention, the latter being defined by the appended claims.

What is claimed is:

1. A device for a fuel supply system, comprising a pressure chamber (44) that communicates with a fuel connection (35, 38, 84), a diaphragm (49) that is secured on an outer peripheral region of said diaphragm in a basic body (30) and said diaphragm partitions off the pressure chamber (44), the diaphragm (49) is fastened in the peripheral region with a spring ring (54, 154) that is under initial tension and is mounted on the basic body (30) directly between the base body (30) and the spring ring (54, 154) independently of a retaining element (62).

2. The device of claim 1, in which the spring ring (54, 154) is embodied as a ring in the form of a cup spring.

3. The device of claim 1, in which the spring ring (54, 154), in a region of a fastening point (57) that cooperates with the peripheral region of the diaphragm (49), has a camlike lobe (58), which engages a congruently formed indentation (60) of the basic body (30).

4. The device of claim 2, in which the spring ring (54, 154), in a region of a fastening point (57) that cooperates with the peripheral region of the diaphragm (49), has a camlike lobe (58), which engages a congruently formed indentation (60) of the basic body (30).

5. The device of claim 1, in which the spring ring (54, 154) has a first portion (56), which in the mounted state is embodied, in cross section, essentially in the form of a plane annular surface.

6. The device of claim 2, in which the spring ring (54, 154) has a first portion (56), which in the mounted state is embodied, in cross section, essentially in the form of a plane annular surface.

7. The device of claim 3, in which the spring ring (54, 154) has a first portion (56), which in the mounted state is embodied, in cross section, essentially in the form of a plane annular surface.

8. The device of claim 5, in which the spring ring (54) has a second portion (59), which adjoins the first portion (56) and is disposed at an obtuse angle to the first portion (56).

9. The device of claim 6, in which the spring ring (54) has a second portion (59), which adjoins the first portion (56) and is disposed at an obtuse angle to the first portion (56).

10. The device of claim 7, in which the spring ring (54) has a second portion (59), which adjoins the first portion (56) and is disposed at an obtuse angle to the first portion (56).

11. The device of claim 1, in which the spring ring (54, 154) is secured to the basic body (30) by a detention connection (71).

12. The device of claim 2, in which the spring ring (54, 154) is secured to the basic body (30) by a detention connection (71).

13. The device of claim 3, in which the spring ring (54, 154) is secured to the basic body (30) by a detention connection (71).

14. The device of claim 5, in which the spring ring (54, 154) is secured to the basic body (30) by a detention connection (71).

15. The device of claim 8, in which the spring ring (54, 154) is secured to the basic body (30) by a detention connection (71).

16. The device of claim 11, in which the detention connection (71) is embodied as an annular collar (70) on the basic body (30), and said collar has hooklike protrusions.

17. The device of claim 11, in which a second portion (59) of the spring ring (54) has individually deflectable tabs (73).

18. The device of claim 16, in which a second portion (59) of the spring ring (54) has individually deflectable tabs (73).

19. The device of claim 11, in which the detention connection (71) is disposed on the basic body (30) and has inward-yielding hooks (72).

20. The device of claim 1, in which the spring ring (54, 154) can be disposed by means of a fastening means (81) that can be inserted on the basic body (30).

21. The device of claim 20, in which the fastening means (81) is a snap ring insertable into a groove (82) of the basic body (30).

22. The device of claim 1, in which the spring ring (54, 154) is retained directly on the basic body (30) by deformation of free ends (76) disposed on the basic body (30).

23. The device of claim 1, in which the spring ring (54, 154) can be disposed under initial tension by means of elements insertable on the basic body (30).

24. A device for a fuel supply system, comprising a pressure chamber (44) that communicates with a fuel connection (35, 38, 84), a diaphragm (49) that is secured on an outer peripheral region in a basic body (30) and said diaphragm partitions off the pressure chamber (44), the diaphragm (49) is fastened in the peripheral region with a spring ring (54, 154) that is under initial tension on a side of said diaphragm remote from the pressure chamber and the spring ring is mounted on the basic body (30) independently of a retaining element (62), a spring (53) located on said side of said diaphragm remote from the pressure chamber (44) presses against the diaphragm (49), and the retaining element (62) retains the spring (53) for pressing against the diaphragm (49).

* * * * *